(12) United States Patent
Ahuja et al.

(10) Patent No.: US 12,005,940 B2
(45) Date of Patent: Jun. 11, 2024

(54) SYSTEMS AND METHODS FOR ROUTE MAPPING

(71) Applicant: Transportation IP Holdings, LLC, Norwalk, CT (US)

(72) Inventors: Munishwar Ahuja, Bangalore (IN); Ajith Kuttannair Kumar, Erie, PA (US); Bret Dwayne Worden, Lawrence Park, PA (US); Shankar Chandrasekaran, Chennai (IN); Dattaraj Jagdish Rao, Bangalore (IN)

(73) Assignee: Transportation IP Holdings, LLC, Norwalk, CT (US)

( * ) Notice: Subject to any disclaimer, the term of this patent is extended or adjusted under 35 U.S.C. 154(b) by 465 days.

(21) Appl. No.: 16/911,561

(22) Filed: Jun. 25, 2020

(65) Prior Publication Data

US 2020/0324797 A1  Oct. 15, 2020

Related U.S. Application Data

(63) Continuation of application No. 15/233,105, filed on Aug. 10, 2016.

(51) Int. Cl.
*B61L 15/00* (2006.01)
*B61L 25/02* (2006.01)
*G01C 21/30* (2006.01)

(52) U.S. Cl.
CPC ....... *B61L 15/0058* (2024.01); *B61L 15/0062* (2024.01); *B61L 15/0072* (2013.01); *B61L 25/025* (2013.01); *G01C 21/30* (2013.01)

(58) Field of Classification Search
CPC .... G01C 21/14; G01C 21/30; G01C 21/3469; B61L 3/006
See application file for complete search history.

(56) References Cited

U.S. PATENT DOCUMENTS

| | | | |
|---|---|---|---|
| 7,164,975 B2 * | 1/2007 | Bidaud | B61K 9/08 246/170 |
| 9,233,696 B2 * | 1/2016 | Kumar | B61L 25/025 |
| 9,463,804 B2 * | 10/2016 | Szwabowski | B60W 40/06 |
| 9,826,674 B2 * | 11/2017 | Matthews | A01B 69/00 |

\* cited by examiner

*Primary Examiner* — Khoi H Tran
(74) *Attorney, Agent, or Firm* — K&L Gates LLP

(57) ABSTRACT

In one embodiment of the subject matter described herein a system is provided. The system includes a location determining circuit configured to acquire position information of a vehicle system moving along a route. The system includes a controller circuit having one or more processors. The controller circuit is configured to calculate curvatures of the route, based at least in part on the position information, to form a curvature waveform. The controller circuit is further configured to generate a route map based on the curvature waveform.

20 Claims, 11 Drawing Sheets

SYSTEMS AND METHODS FOR ROUTE MAPPING

CROSS-REFERENCE TO RELATED APPLICATIONS

This application is a continuation of U.S. patent application Ser. No. 15/233,105, which was filed on 10 Aug. 2016, and the entire disclosure of which is incorporated herein by reference.

FIELD

Embodiments of the subject matter disclosed herein generally relate to systems and methods for route mapping of a route traversed by a vehicle system.

BACKGROUND

A map database includes grade information, curvature information, and/or length information of candidate routes, such as roads, highways, rail track, and/or the like that may be traversed by a vehicle. The map database is conventionally a static set of map information generated by one or more map vendors. The map database is utilized during one or more operations of the vehicle, such as to generate trip plans that automatically control the vehicle when traversing the route, to determine a duty cycle of one or more components of the vehicle, to assign location information of route defects, and/or the like. However, the route may change over time due to geological shifts, temperature changes, damage to the route, and/or the like. Additionally, errors, gaps, missing sections, and/or the like of the map database may reduce efficiency in the trip plans and/or mis-assign location information to route defects identified by the vehicle. Further, components of the vehicle may deteriorate at unexpected rates due to inaccurate duty cycle information. For example, inaccuracies in the curvature information relating to the radii of the curves of the route may reduce the effectiveness of the duty cycle calculations of the one or more components of the vehicle. Thus, defects in the map database may reduce the effectiveness of the one or more operations of the vehicle.

BRIEF DESCRIPTION

In an embodiment, a system (e.g., for generating a route map) is provided. The system includes a location determining circuit configured to acquire position information of a vehicle system moving along a route. The system includes a controller circuit having one or more processors. The controller circuit is configured to operate to calculate curvatures of the route, based at least in part on the position information, to form a curvature waveform. The controller circuit is further configured to generate a route map based on the curvature waveform.

In an embodiment, a method (e.g., for generating a route map) is provided. The method includes acquiring position information of a vehicle system moving along a route. The method further includes calculating curvatures of the route, based on the position information, to form a curvature waveform. The method also includes generating a route map based on the curvature waveform.

In an embodiment, a method (e.g., for generating a route map) is provided. The method includes acquiring position information of a vehicle system moving along a route, and calculating curvatures of the route, based on the position information, to form a curvature waveform. The method further includes identifying a circular curve of the route based on a morphology of the curvature waveform, determining a size of the identified circular curve by fitting a circle to the circular curve and defining a route map based on the circular curve. The method also includes generating duty cycle information based on the route map. The duty cycle information includes at least one of a time interval of the circular curve, a length of the circular curve, a grade of the circular curve, or a speed of the vehicle system when traversing along the circular curve.

BRIEF DESCRIPTION OF THE DRAWINGS

The presently described subject matter will be better understood from reading the following description of non-limiting embodiments, with reference to the attached drawings, wherein below.

DETAILED DESCRIPTION

One or more embodiments herein describe systems and methods that relate to route mapping a route (e.g., railway track, highway, and/or the like) traversed by a vehicle system. For example, the vehicle system defines a route map by determining a length of the route, a grade of the route, curve information (e.g., radii) of the route, speed as the vehicle traverses the route, altitude information of the route, and/or the like. For example, the route map is a route profile that includes information of the circular curves, straight throughs, spiral curves, and/or the like of the route. The route mapping may be utilized to establish and/or validate a map database, accessing a duty cycle of the vehicle system and/or component(s) of the vehicle system, evaluate performance of the vehicle system, used to determine trip plans, add and/or remove information to the map database, and/or the like. The route mapping is based on GPS data (latitude, longitude, altitude, speed) acquired by the vehicle system when traversing along the route. Optionally, structural responses of the vehicle system (e.g., displacement, strain, acceleration) may be acquired concurrently with the GPS data when the vehicle system traverses along the route. Additionally or alternatively, the vehicle system may utilize the GPS data to determine a contribution to changes in the structural responses, such as irregularity of the route, curvature of the route, and/or the like.

While the discussion and figures included herein may be interpreted as focusing on rail vehicle consists (e.g., trains) as the vehicle systems, it should be noted that not all embodiments of the subject matter herein described and claimed herein are limited to trains and railroad tracks. (A consist is a group of vehicles that are mechanically linked to travel together.) The subject matter of the systems and methods disclosed herein may apply to other vehicles, such as automobiles, trucks, and/or the like. Additionally, the vehicle system may not be mechanically linked but may be logically linked. For example, communicatively coupled with each other to coordinate travel along a route.

Figure 1:
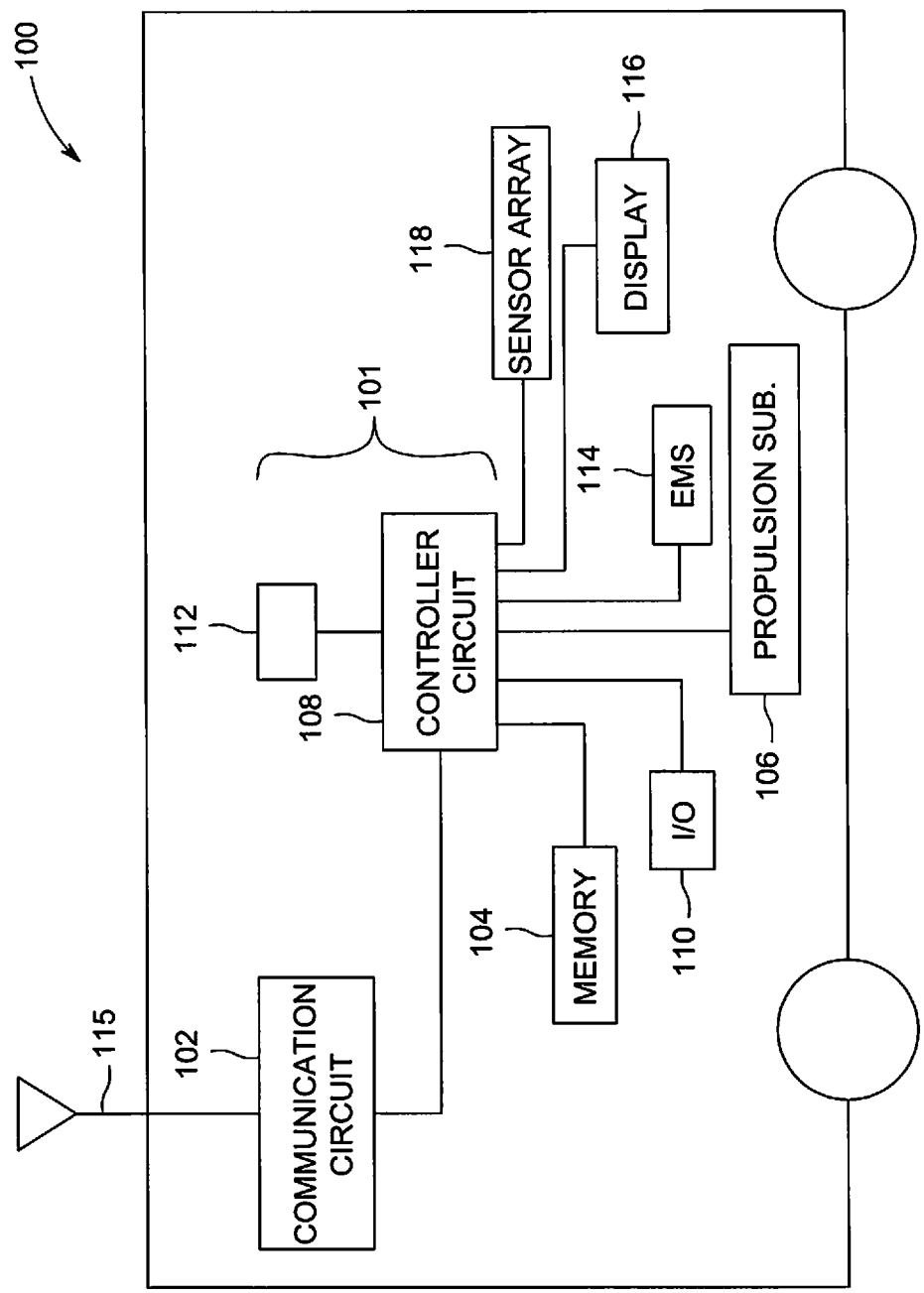
FIG. 1 is a schematic diagram of a vehicle system, in accordance with an embodiment.

FIG. 1 is a schematic diagram of a vehicle system 100, in accordance with an embodiment. It should be noted that although the vehicle system 100 is shown as a single propulsion-generating vehicle (PGV), in other embodiments the vehicle system 100 may include more than one PGV and/or one or more non-propulsion generating vehicles mechanically coupled together to form a consist. The vehicle system 100 may include a communication circuit 102, a memory 104, a propulsion subsystem 106, an input/output (I/O) device 110, a display 116, energy management subsystem 114, and a mapping system 101. The mapping system 101 is configured to define a route map. The mapping system 101 may include a controller circuit 108 and a location determining circuit 112. Optionally, the mapping system 101 may include the communication circuit 102. The components of the vehicle system 100 and/or the mapping system 101 may communicate with each other via wired and/or wireless connections. Additionally or alternatively, the vehicle system 100 may include one or more components in addition to the listed components and/or one or more of the listed components may be included on a different vehicle that is communicatively coupled to the vehicle system 100.

The communication circuit 102 may include a transceiver, a transmitter and receiver, and/or the like. The communication circuit 102 may be electrically coupled to an antenna 115, for example, the communication circuit 102 is configured to wirelessly communicate, bi-directionally, with off-board locations, such as a remote system (e.g., central dispatch facility), other vehicle systems traveling within a transportation network, vehicles (e.g., PGV, non-propulsion generating vehicles) within the vehicle system 100, and/or the like.

The memory 104 is an electronic storage device configured to store location information, trip data, for example, a trip plan, and/or the like. Optionally, the memory 104 may be configured to store route information of a transportation network (e.g., map database) such as grade information, emission limits, traffic information received by the communication circuit 102, and/or the like. The contents of the memory 104 may be accessed by the controller circuit 108, a user via the I/O device 110, the communication circuit 102, the energy management subsystem 114, and/or the like.

The propulsion subsystem 106 is configured to provide tractive efforts to propel the vehicle system 100 along the route. The propulsion subsystem 106 may include one or more engines and/or motors, wheels, fins, or treads that engage the track material, and also a fuel or power source that energizes the engines and/or motors. The propulsion subsystem 106 may be associated with a braking subsystem (not shown) that is configured to slow movement of the vehicle system 100 and/or prohibit movement of the vehicle system 100 completely when actuated.

The I/O device 110 is configured to receive input information from one or more user devices, such as a keyboard, a mouse, a hand-held device (e.g., cell phone, tablet, PDA, etc.), touchscreen, and/or a graphical user interface of the display 116. The I/O device 110 may transmit the input information to the controller circuit 108 for processing.

The display 116 may be an LCD (liquid crystal display), plasma display, CRT monitor, or the like. Optionally, the display 116 may include a touch sensitive surface (e.g., sensor or set of sensors that accepts input from a user based on haptic and/or tactile contact) which may be used as a part of the I/O device 110. For example, the display 116 may display a graphical user interface which is interfaced by the user by interacting with the touch sensitive surface of the display 116.

The location determining circuit 112 is configured to track the movement of the vehicle system 100 along the route. The location determining circuit 112 includes one or more receivers configured to receive radio frequency (RF) signals emitted from orbiting satellites. For example, the location determining circuit 112 may be configured to use global positioning system (GPS) technology to communicate with orbiting GPS satellites. The location determining circuit 112 include one or more processors configured to compare the received communications from the multiple GPS satellites to determine the location (e.g., longitudinal coordinate, latitude coordinates, altitude) of the location determining circuit 112 over time represented, which is stored as GPS data in the memory 104. The location of the vehicle system 100 may be determined based on the coordinates acquired by the location determining circuit 112. Additionally or alternatively, the location determining circuit 112 may communicate with the sensor array 118 or markers (e.g., mile markers, intersection markets, and/or the like) along the route to assign location information of the vehicle system 100 along the route to sensor measurements acquired by the sensor array 118. The location determining circuit 112 may include wireless transceiver hardware and/or circuitry to triangulate the location of the vehicle system 100 along the route using wireless signals transmitted by the orbiting satellites. Additionally or alternatively, the data from the sensor array 118 may be used by the location determining circuit 112 to increase a resolution of the location coordinates. Optionally, the location determining circuit 112 may be used to provide a more accurate velocity or speed of the vehicle system 100 based on the change in location of the vehicle system 100 over time. Additionally or alternatively, the location determining circuit 112 may be used by the controller circuit 108 to determine the location of the vehicle system 100 continuously, or at various times along a trip, in order to determine the position of the vehicle system 100 relative to the trip plan.

The controller circuit 108 controls the operation of the mapping system 101 and/or the vehicle system 100. The controller circuit 108 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 104. The memory 104 may include one or more computer hard drives, flash drives, RAM, ROM, EEPROM, or the like. Alternatively, one or more of the sets of instructions that direct operations of the hardware may be hard-wired into the logic of the hardware.

The energy management subsystem 114, communicating with the controller circuit 108, controls operations of the propulsion subsystems 106 of the vehicle system 100 adhering to a trip plan selected by a user. The energy management subsystem 114 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, including one or more computer hard drives, flash drives, RAM, ROM, EEPROM, or the like. Alternatively, one or more of the sets of instructions that direct operations of the hardware may be hard-wired into the logic of the hardware. Additionally or alternatively, the energy management subsystem 114 may be integrated with and/or a part of the controller circuit 108. For example, the operations of the energy management subsystem 114 may be performed by the controller circuit 108. The trip plan of the vehicle system 100 includes the travel of the vehicle system 100 along a route from a starting location to a destination location. The trip plan may be based on the route map generated by the mapping system 101. For example, the controller circuit 108 and/or energy management subsystem 114 may generate the trip plan based on the route map generated by the mapping system 101. Optionally, the controller circuit 108 and/or the energy management subsystem 114 may control the propulsion subsystem 106 directly. For example, the controller circuit 108 and/or the controller circuit 108 may be configured to control the vehicle system 100 based on the route map, which is utilized to generate the trip plan. The energy management subsystem 114 can refer to the trip plan that includes information related to the vehicle system 100 (e.g., amount of tractive effort, efficiency of propulsion), stored in the map database (e.g., the route, the geography over which the route extends), and/or the like in order to control the tractive efforts of the vehicle system 100 (e.g., based on the one or more PGV of the vehicle system 100).

The energy management subsystem 114 may communicate with the propulsion subsystem 106 to change the tractive effort as the vehicle system 100 travels over different segments of the designated route of the trip plan. For example, if the vehicle system 100 is approaching a steep incline and the trip profile indicates that the vehicle system 100 is carrying significantly heavy cargo, then the energy management subsystem 114 may direct the vehicle system 100 to increase the tractive efforts supplied by the propulsion subsystem 106. Conversely, if the vehicle system 100 is carrying a smaller cargo load based on the trip profile, then the energy management subsystem 114 may direct the propulsion subsystem 106 to increase the supplied tractive efforts by a smaller amount than the tractive efforts would otherwise be increased if the data indicated a heavier cargo load. The energy management subsystem 114 may notify the user of the operating actions, such as, to increase tractive effort, by displaying a message on the display 116.

The tractive efforts may be changed in response to other factors, such as changes in the route that the vehicle system 100 travels along, regulatory requirements (e.g., emission limits) of the regions through which the vehicle system 100 travels within the transportation network 100, and the like, based on the trip plan. For example the tractive efforts may be changed due to at or below allowed speeds (e.g., vehicle system 100 speed limits) while traveling along segments along the designated route The trip plan may be received by the vehicle system 100 from the communication circuit 102 or generated by the controller circuit 108 based on the route map. For example, the route map defined by the mapping system 101 may be utilized by the energy management system 114. The trip plan includes the operating parameters or orders for the vehicle system 100 executed by the energy management subsystem 114. The parameters include the tractive and braking efforts expressed as a function of location of the vehicle system 100 along the trip, distance along the designated route, speed of the vehicle system 100, and/or time, as defined by the upcoming segment of the route. The trip plan optionally may also include additional information, such as suggested primary and secondary routes, time schedule (e.g., departure times, arrival times), energy usage, the allowed speed of a segment, and the like. In one aspect, the trip plans can designate the operational settings so that travel of a vehicle system 100 according to the trip plan causes the vehicle system 100 to consume less fuel and/or generate fewer emissions than the vehicle system 100 traveling along the same designated route with different operational settings. The trip plan may be established using an algorithm based on models for vehicle behavior for the vehicle system 100 along the designated route.

In an embodiment, the memory 104 may store a software application, executed by the controller circuit 108 and/or energy management subsystem 114, such as the Trip Optimizer™ system provided by General Electric Company, or another energy management system. For additional discussion regarding trip plans (e.g., trip profiles), see U.S. patent application Ser. No. 12/955,710, Publication No. 2012/0136515, "Communication System for a Rail Vehicle Consist and Method for Communicating with a Rail Vehicle Consist," filed 29 Nov. 2010, the entire contents of which are incorporated herein by reference. The Trip Optimizer™ system can create a trip profile that can reduce braking of the rail vehicle by learning the rail vehicle's characteristics and calculating an efficient way of running the rail vehicle by considering factors such as the length and weight of the rail vehicle, the grade of the route that the rail vehicle will be traversing, conditions of the track that the rail vehicle will be traveling along, weather conditions, and performance of the rail vehicle. During the trip, the propulsion subsystem is at least partially controlled by the Trip Optimizer™ system to propel the rail vehicle along its route according to the trip profile.

The vehicle system 100 may include the sensor array 118. The sensor array 118 may include a plurality of sensors to monitor and/or acquire the environment of the vehicle system 100 when traversing along the route. The sensor array 118 may include an imaging sensor to acquire images of the environment of the vehicle system 100. For example, the controller circuit 108 may execute an image recognition software to detect abnormalities and/or defects (e.g., missing way-side signage) of the route and/or proximate to the route. The image recognition software may capture and log a location and/or position of the abnormalities and/or defect in the memory 104. In another example, the sensor array 118 may include an accelerometer to acquire sensor measurements corresponding to a structure response (e.g., measure changes in vertical position, and/or the like) of the vehicle system 100 traversing along the route. In various embodiments, the structure response may be utilized to assess a health of the route. For example, the controller circuit 108 may receive the sensor measurements may determine changed in vertical position of the vehicle system 100 within a predetermined period corresponds to damage to the route surface (e.g., track, highway, and/or the like) representing the health of the route.

Figure 2:
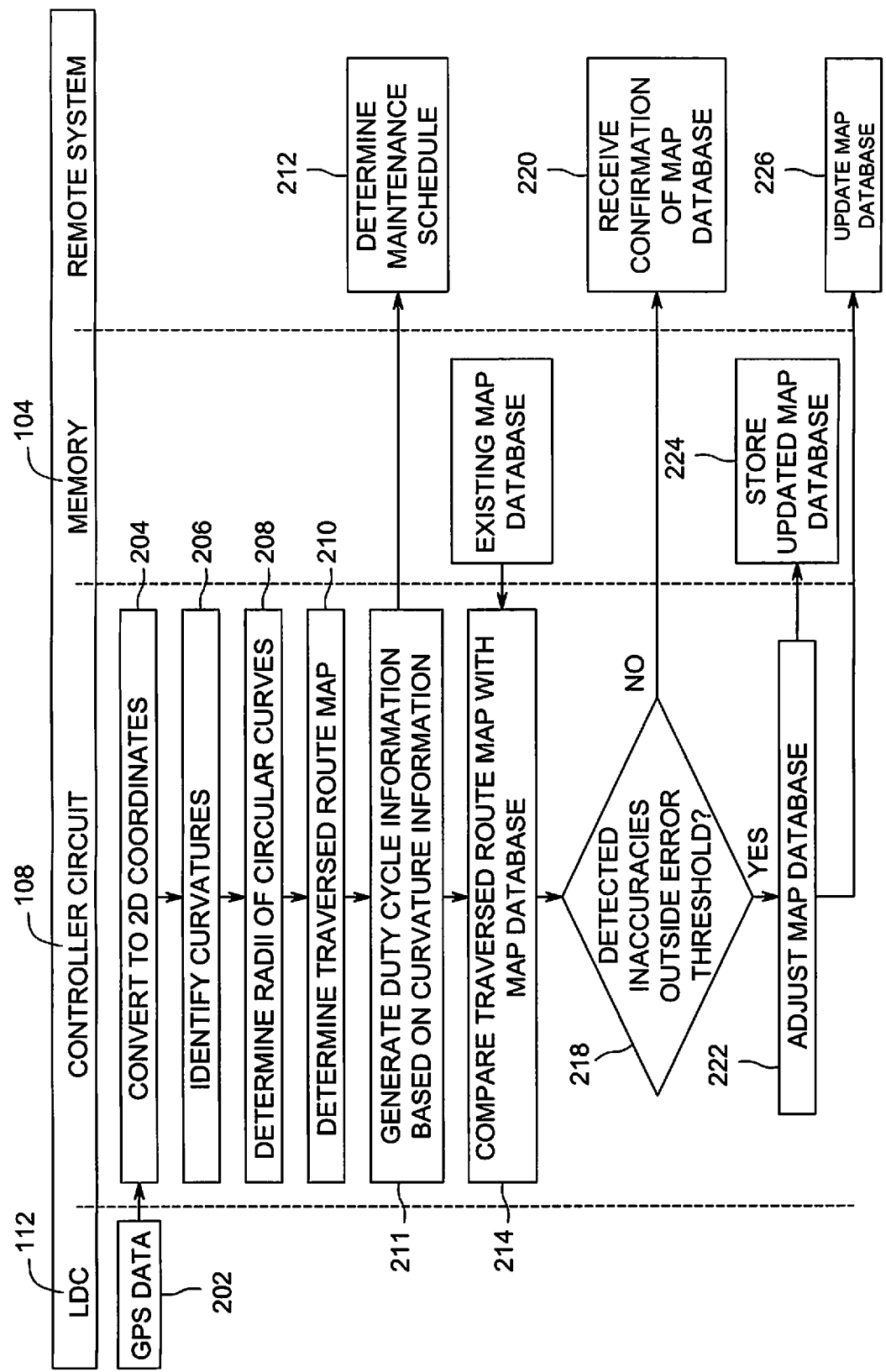
FIG. 2 is a swim lane diagram of a method for route mapping, in accordance with an embodiment.

FIG. 2 is a swim lane diagram 200 of a method for route mapping, in accordance with an embodiment. The method, for example, may employ or be performed by structures or aspects of various embodiments (e.g., systems and/or methods) discussed herein to define a route map. For example, the swim lane diagram 200 includes operations performed by and/or changes to the memory 104, the controller circuit 108 (e.g., the mapping system 101), the location determining circuit 112, and/or the remote system (e.g., a remote system 1100 shown in FIG. 11). In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method may be able to be used as one or more algorithms to direct hardware to perform one or more operations described herein.

Beginning at 202, the location determining circuit 112 acquires GPS data. The GPS data includes position information corresponding to a latitude, longitude, and altitude ($\phi$, $\lambda$, h) of the vehicle system 100 moving (e.g., traversing) along the route over time. Optionally, the latitude and longitude may be degree values.

It may be noted in various embodiments the acquisition of the GPS data may not be acquired continuously by the location determining circuit 112. Optionally, the acquisition of GPS data may be periodically acquired by the location determining circuit 112 for a set period. Additionally or alternatively, the acquisition of the GPS data may be interrupted and/or blocked when traversing along the route. For example, the GPS data may be interrupted by structures along the route, tunnels, and/or the like. In various embodiments, the method 200 is performed based on each continuous section of the route. Additionally or alternatively, the route may be divided into a number of sections, based on whether the distance between adjacent data points is greater than a predetermined threshold (e.g., 20 meters).

At 204, the controller circuit 108 converts the GPS data to two dimensional (2D) coordinates. The longitude and latitude information corresponds to a three dimensional position of the vehicle system 100. For example, the controller circuit 204 may convert the longitude and latitude degree values to radians based on Equations 1 and 2. The variable R may represent the radius of the earth, 6,371,000 meters. The variable y represents the longitude values in radians (e.g., meters), and the variable x represents the latitude values in radians (e.g., meters). The variable $\phi_m$ represents a mean latitude value (in radians). It may be noted that the GPS data may be converted to 2D coordinates utilizing another method known in the art (e.g., not using Equations 1 and 2). For example, the controller circuit 108 may convert the GPS data to universal traverse mercator coordinates, universal polar stereographic coordinates, and/or the like.

$$y = R*\phi \quad \text{Equation (1)}$$

$$x = R*\lambda*\cos(\phi_m) \quad \text{Equation (2)}$$

Figure 3:
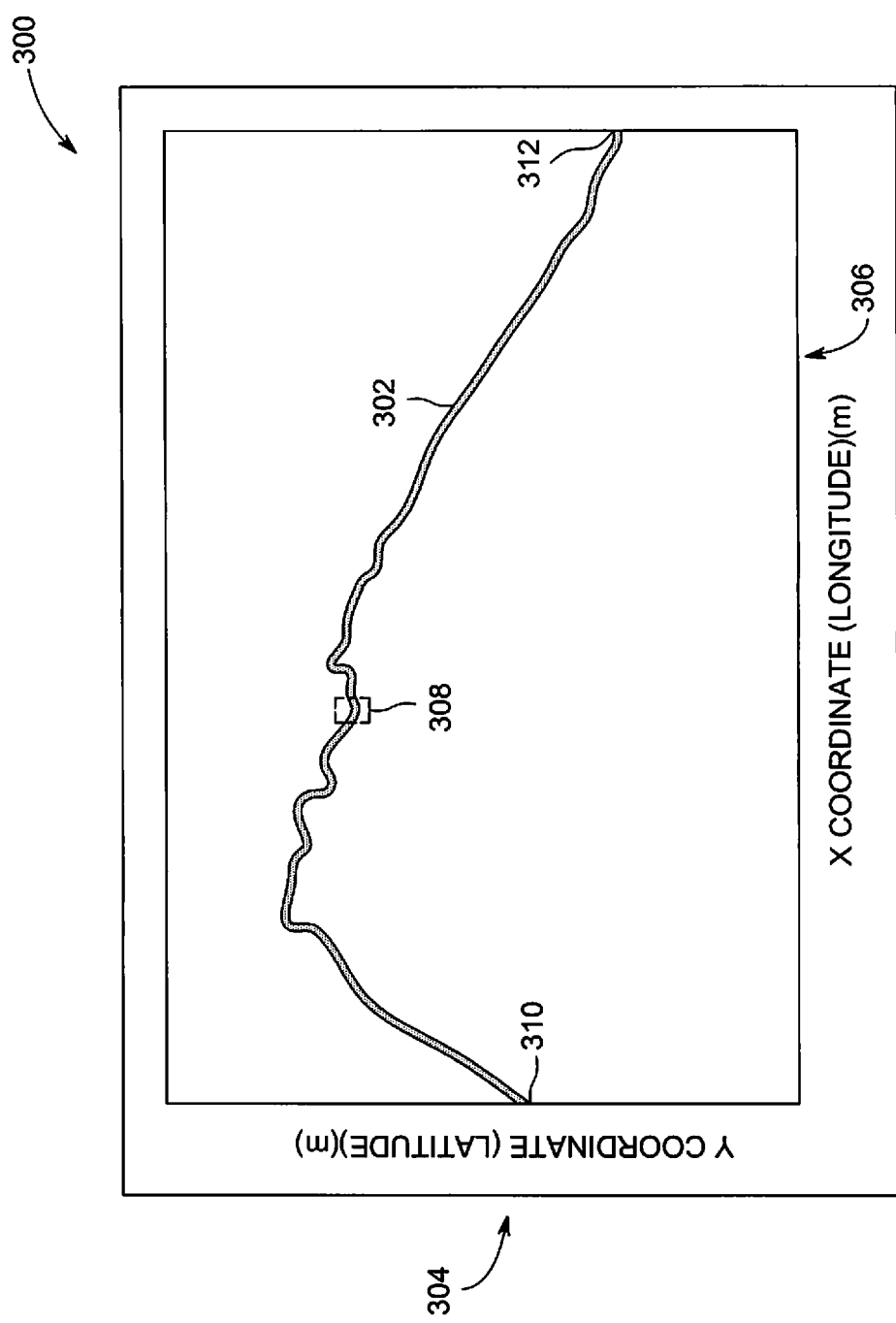
FIG. 3 is a two dimensional graphical illustration of a route traversed by a vehicle system, in accordance with an embodiment.

FIG. 3 is a 2D graphical illustration 300 of a route 302 traversed by the vehicle system 100, in accordance with an embodiment. The route 302 extends from a start data point 310 to an end data point 312 of the route 302 representing a start and end, respectively, in time. The 2D graphical illustration 300 may represent a series of data points that are plotted along a vertical and horizontal axes 304-306. For example, each data point corresponding to a longitude and latitude coordinate in radians may be calculated using Equations 1 and 2 of the GPS data at a point in time. The latitude is represented along an x axis (e.g., the horizontal axis 306) and the longitude is represented along a y axis (e.g., the vertical axis 304). For example, the route 302 is plotted along the horizontal axis 306 representing a latitude position of the vehicle system 100 calculated by the controller circuit 108 utilizing Equation 2, and the vertical axis 304 representing a longitude position of the vehicle system 100 calculated by the controller circuit 108 utilizing Equation 1.

At 206, the controller circuit 108 identifies curvatures of the route 302. The controller circuit 108 may increment a measurement window 308 along the route 302 to calculate curvatures of the route 302. The measurement window 308 may correspond to select portions of the route based on a length of time and/or distance the vehicle system 100 traversed along the route 302. For example, the measurement window 308 may correspond to a predetermined length of time and/or number of data points along the route 302, such as a predetermined length of twenty data points. Optionally, the predetermined length of the measurement window 308 may be based on a sampling frequency of the location determining circuit 112. For example, the location determining circuit 112 may be configured to receive information from the GPS satellites at a predetermined sampling frequency. For example, the measurement window 308 defines a select dataset of successive data points along the route 302. The controller circuit 108 may utilize the selected date within the measurement window 308 of the route 302 to determine if a curvature of the route 302 is within the selected data. The controller circuit 108 may increment and/or move the measurement window 308 to include at least one different data point within the measurement window 308 when the controller circuit 108 analyzed the data points within the measurement window 308. For example, the controller circuit 108 may shift the measurement window 308 along the route 302 by one data point.

Figure 4:
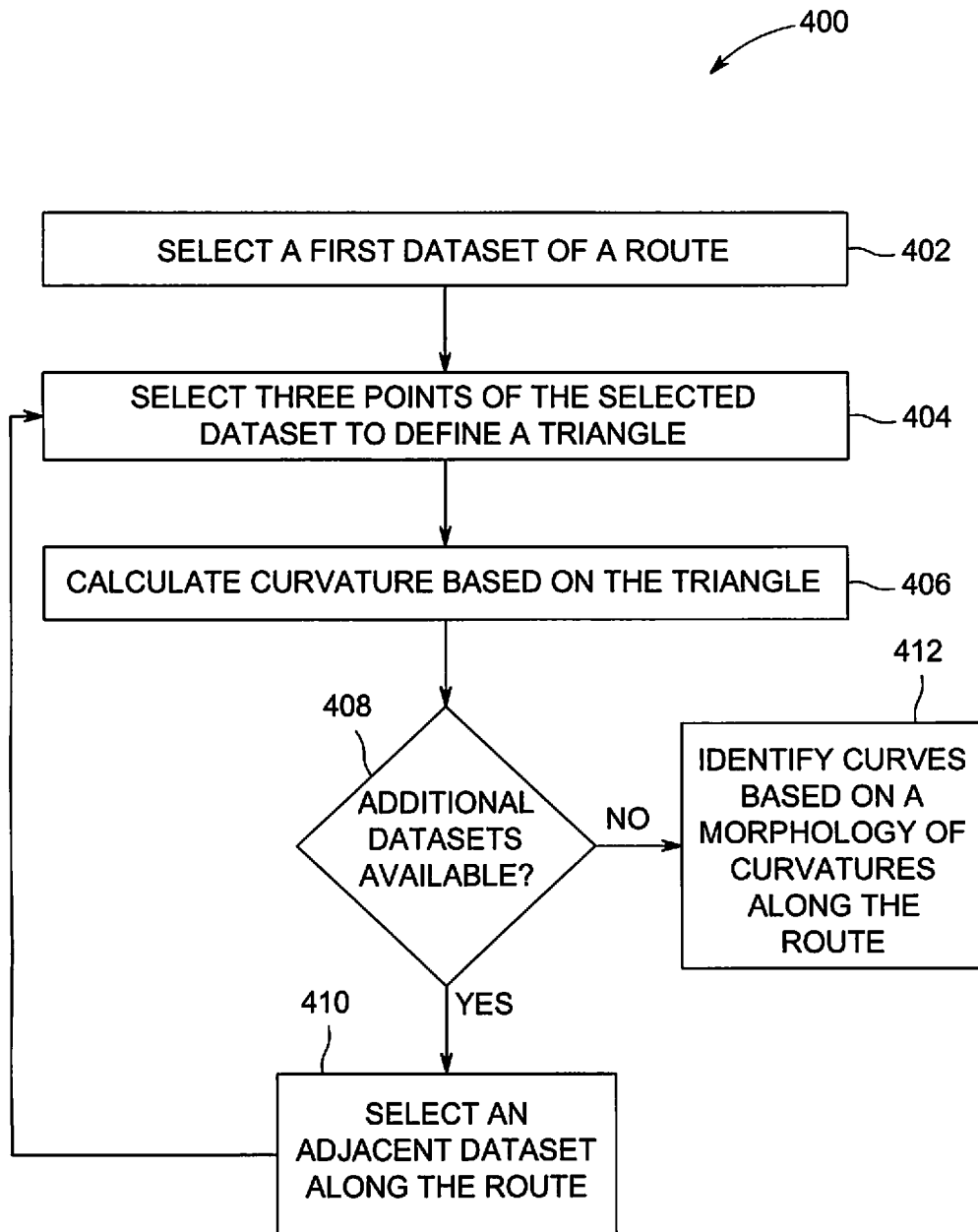
FIG. 4 is a flow chart of a method to identify curvatures of the route shown in FIG. 3, in accordance with an embodiment.

In connection with FIG. 4, the controller circuit 108 may identify curvatures within the measurement window 308 corresponding to a select data set of the route 302 utilizing a method 400.

FIG. 4 is a flow chart of a method 400 to identify curvatures of the route 302, in accordance with an embodiment. In various embodiments, certain operations may be omitted or added, certain operations may be combined, certain operations may be performed simultaneously, certain operations may be performed concurrently, certain operations may be split into multiple operations, certain operations may be performed in a different order, or certain operations or series of operations may be re-performed in an iterative fashion. In various embodiments, portions, aspects, and/or variations of the method 400 may be able to be used as one or more algorithms to direct hardware to perform one or more operations described herein. Furthermore, it is noted that the following is just one possible method for identifying planned segment speeds that correspond to a point of interest. It should be noted, other methods may be used, in accordance with embodiments herein.

Beginning at 402, the controller circuit 108 selects a first dataset of the route 302. The first dataset may correspond to a series of data points within the measurement window 308 at a beginning and/or start of the route 302. For example, the first dataset may include and/or be proximate to the start data point 310 of the route 302. Additionally or alternatively, a position of the first dataset is at a set number of data points from the start data point 310 of the route 302. For example, the controller circuit 108 may assign an initial series of data points from the start data point 310 of the route 302 to the predetermined length at a curvature of zero. The controller circuit 108 may select the first dataset successively after the initial series of data points.

At 404, the controller circuit 108 may select three data points 501-503 (FIG. 5) of the selected dataset within the measurement window 308 to define a triangle 506. In connection with FIG. 5, the triangle 506 may be configured by the controller circuit 108 to include opposing ends of the selected dataset. For example, the three data points 501-503 may define a triangle 506 that extends across the selected dataset.

Figure 5:
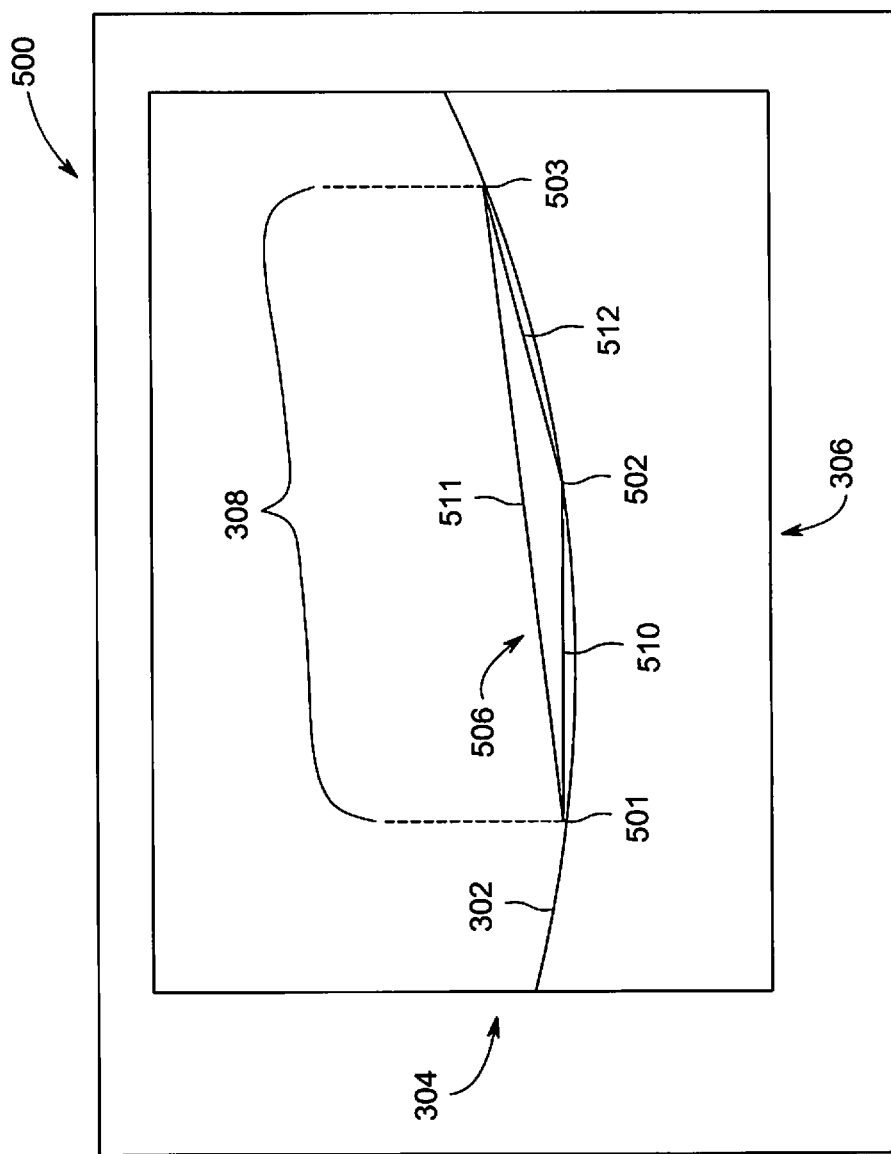
FIG. 5 is a graphical illustration of a selected dataset, in accordance with an embodiment.

FIG. 5 is a graphical illustration 500 of the selected dataset, in accordance with an embodiment. For example, the selected dataset may correspond to the date points defined within the measurement window 308. The controller circuit 108 may select opposing data points 501 and 503 positioned at opposing ends of the selected dataset. Based on the opposing data points 501 and 503, a side 511 of the triangle 506 extends along a length of the route 302 corresponding to the selected dataset (e.g., the measurement window 308). The controller circuit 108 may select a third data point 502 interposed between the opposing data points 501 and 503 to form the triangle 506.

At 406, the controller circuit 108 may calculate a curvature based on the triangle 506. The curvature of the triangle 506 may be calculated based on Equation 3. For example, the variables a, b and c may represent the sides 510-512 of the triangle 506 formed by the data points 501-503. The variable A represents an area of the triangle 506 formed by the three data points 501-503. The variable p represents the curvature of the triangle 506. It may be noted that the curvature of the triangle 506 may be calculated utilizing another method known in the art (e.g., not using Equation 3).

$$\rho = \frac{4 \cdot \Delta}{a \cdot b \cdot c} \qquad \text{Equation (3)}$$

At 408, the controller circuit 108 may determine whether additional datasets available along the route 302. The controller circuit 108 may select additional datasets along the route 302 until the controller circuit 108 has calculated curvatures for the entire route 302. The controller circuit 108 may determine that additional datasets are available along the route 302 if the selected dataset does not include the end data point 312.

In another example, the controller circuit 108 may compare a position of the selected dataset relative to the data points of the route 302. If the position of the selected dataset is within the predetermined length of the end data point 312 the controller circuit 108 may determine that no additional datasets are available along the route 302. For example, the controller circuit 108 may assign an end series of data points from the end data point 312 of the route 302 to the predetermined length towards the start data point 310 at a curvature of zero.

If additional datasets are available, then at 410 the controller circuit 108 may select an adjacent dataset along the route 302. For example, the controller circuit 108 may sweep and/or adjust the selected data points successively along the route 302 by adjusting the measurement window 308. The controller circuit 108 may shift the measurement window (e.g., the measurement window 308) along the route such that at least one data point of the route 302 may be different that was not included in the selected dataset to define a new selected data set. For example, the new selected dataset may be shifted to include a start data point that is adjacent to the start data point 310 of the selected dataset and include an end data point that was not included in the selected dataset. The controller circuit 108 is configured to sweep and/or adjust the selected data points along the route to successively calculate curvatures of at least a portion of the data points along the route 302.

If additional datasets are not available, then at 412 the controller circuit 108 may identify curves based on a morphology of curvatures along the route 302. In connection with FIG. 6, the morphology of the curvatures may be based on a curvature waveform 606, which is formed by the curvatures calculated at 406 from the route 302.

Figure 6:
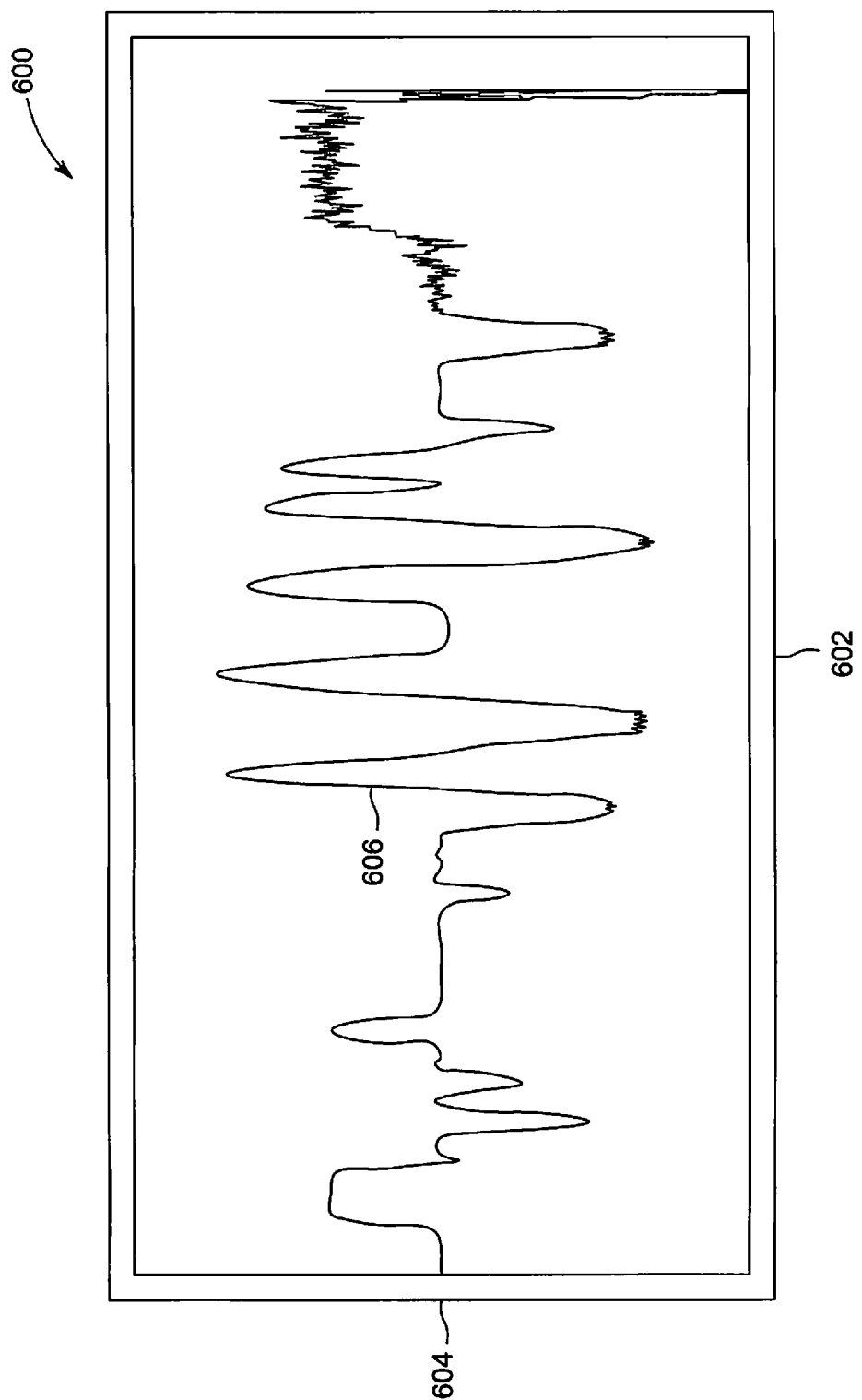
FIG. 6 is a graphical illustration of curvature waveform based on the route shown in FIG. 3, in accordance with an embodiment.

FIG. 6 is a graphical illustration 600 of curvature waveform 606 based on the route 302, in accordance with an embodiment. The curvature waveform 606 represents the curvatures calculated (along a vertical axis 604) at 406 of the route 302 versus time, which is represented by a horizontal axis 602. The morphology corresponding to a slope, amplitude, shape, and/or the like of the curvature waveform 606 may be utilized by the controller circuit 108 to generate the route map by identifying curvatures of the route 302, straight throughs, spirals, and/or the like. For example, regions of the curvature waveform 606 having no amplitude, such as a curvature of approximately zero, correspond to tangents and/or portions of the route 302 that is not curved (e.g., straight through). In another example, regions of the curvature waveform 606 where the curvature has a slope correspond to spirals of the route 302 that are prior and/or subsequent to a circular curve. In another example, regions of the curvature waveform 606 having an amplitude with minimal slope (e.g., approximate to zero within a set threshold), such as peaks of the curvature waveform 606, correspond to circular curves of the route 302. The circular curve may correspond to a portion of the route 302 having a defined degree of curvature having a radius.

Figure 7:
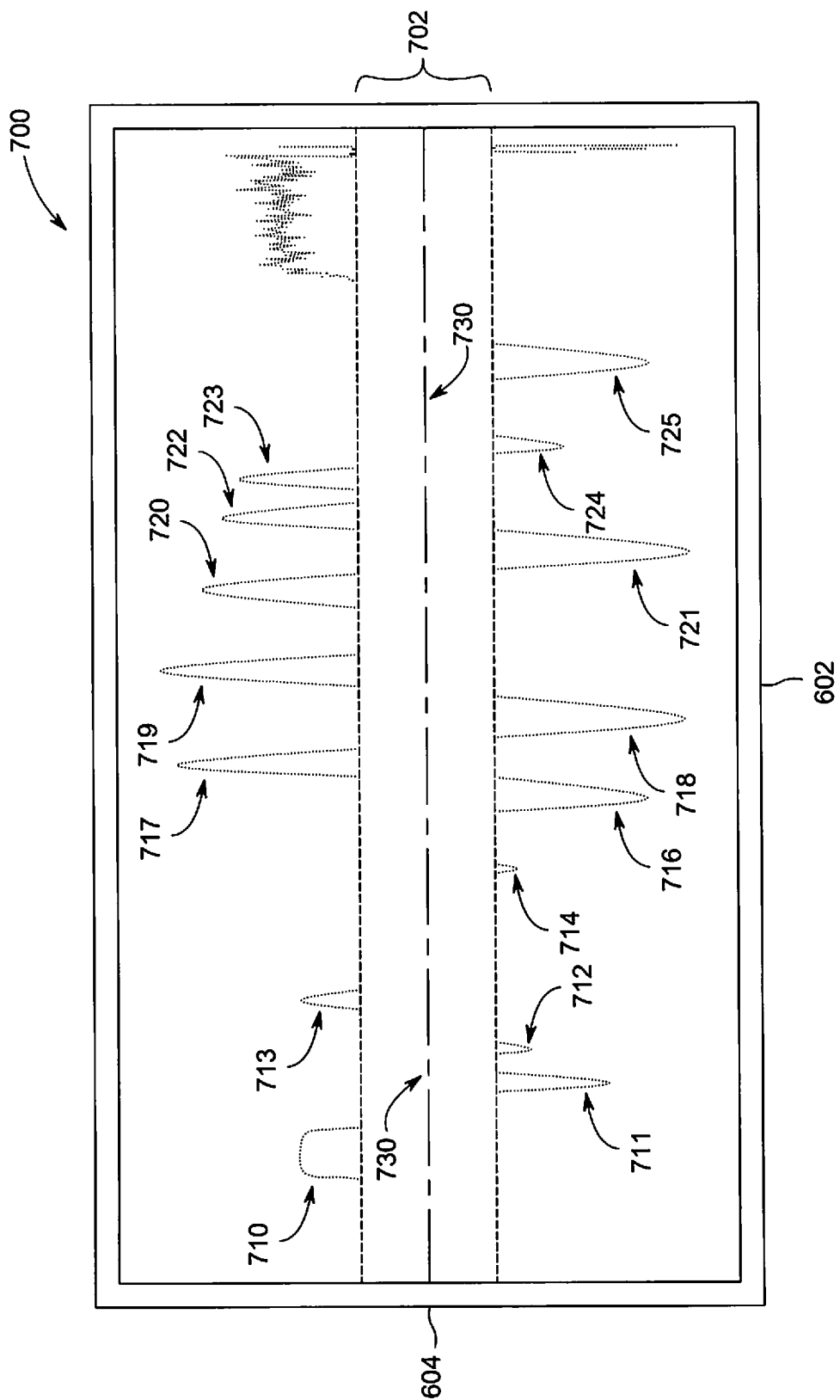
FIG. 7 is a graphical illustration of identified curvatures based on the curvature waveform shown in FIG. 6, in accordance with an embodiment.

In connection with FIG. 7, the controller circuit 108 may identify the circular curves of the route 302 by detecting regions of the curvature waveform 606 having a non-zero constant.

FIG. 7 is a graphical illustration 700 of identified curvatures 710-725 based on the curvature waveform 606, in accordance with an embodiment. The identified curvatures 710-725 correspond to regions of the curvature waveform 606 having a non-zero constant. For example, the identified curvatures 710-725 correspond to curvature peaks of the curvature waveform 606 that have an amplitude. The controller circuit 108 may apply a filter bandwidth 702 to filter and/or set portions 730 of the curvature waveform 606 that are approximate to a zero curvature, such as absolute curvature values less than 0.0005 1/m. For example, the portions 730 of the curvature waveform 606 interposed between the identified curvatures 710-725 may be identified by the controller circuit 108 as a straight throughs (e.g., not curved). The remaining portions of the curvature waveform 606, outside the filter bandwidth 702 that are non-zero, are identified by the controller circuit 108 as the identified curvatures 710-725 that include circular curves of the route 302.

The controller circuit 108 may identify time intervals of the identified curvatures 710-725 that correspond to when the circular curves occur during the route 302. For example, the identified curvatures 710-725 may include portions corresponding to a spiral (e.g., slope), a circular curve, and/or the like. The controller circuit 108 may partition each identified curvature 710-725 into a separate array of curvature values to determine a time interval corresponding to the circular curve.

Figure 8:
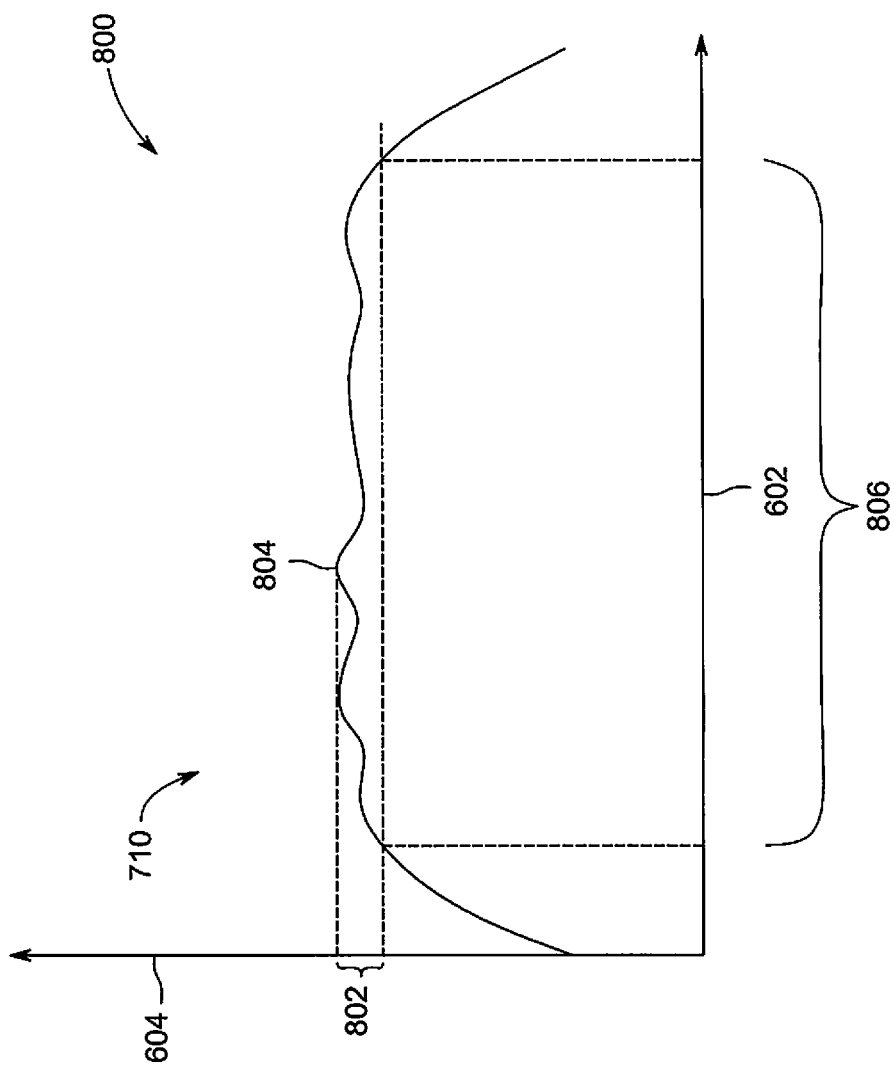
FIG. 8 is a graphical illustration of an identified curvature shown in FIG. 7, in accordance with an embodiment.

In connection with FIG. 8, the controller circuit 108 may identify a time interval 806 representing the circular curve within the identified curvature 710, which occurs when a curvature of the identified curvature 710 is approximately constant.

Returning to FIG. 2, at 208 the controller circuit 108 determines radii of the circular curves. The controller circuit 108 may determine a size of each circular curve of the identified curvature 710-725 of the route 302 identified at 412. The size of the circular curve may include a radius, circumference, diameter, and/or the like. For example, in connection with FIG. 9, the controller circuit 208 may determine the size of the circular curves of the route 302 by utilizing a circle fitting algorithm.

FIG. 8 is a graphical representation 800 of the identified curvature 710 shown in FIG. 7. The controller circuit 108 may determine when the circular curve occurs within the identified curvature 710 corresponding based on changes in the identified curvature 710 with respect to a maximum curvature value 804. For example, the maximum curvature value 804 may represent a peak of the identified curvature 710. Based on the maximum curvature value 804, the controller circuit 108 may determine a threshold 802 to identify the circular curve within the identified curvature 710. For example, the threshold 802 may be based on a difference in curvature value with respect to the maximum curvature value 804, such as within 10%. The controller circuit 108 may determine curvature values interposed between the threshold 802 and the maximum curvature value 804 are approximately constant. For example, the controller circuit 108 identifies the curvature values of the identified curve 710 during the time interval 806 are at and/or above the threshold 802. Based on the curvature values within the time interval 806 being interposed between the threshold 802 and the maximum curvature value 804, the controller circuit 108 may determine that the curvature values during the time interval 806 represent a circular curve. The curvature values within time interval 806 may be utilized by the controller circuit 108 to calculate the radius of circular curve.

Additionally or alternatively, the controller circuit 108 may determine a distance traveled by the vehicle system 100 during the time intervals (e.g., the time interval 806) that define the circular curves corresponding to a length of the circular curves.

Figure 9:
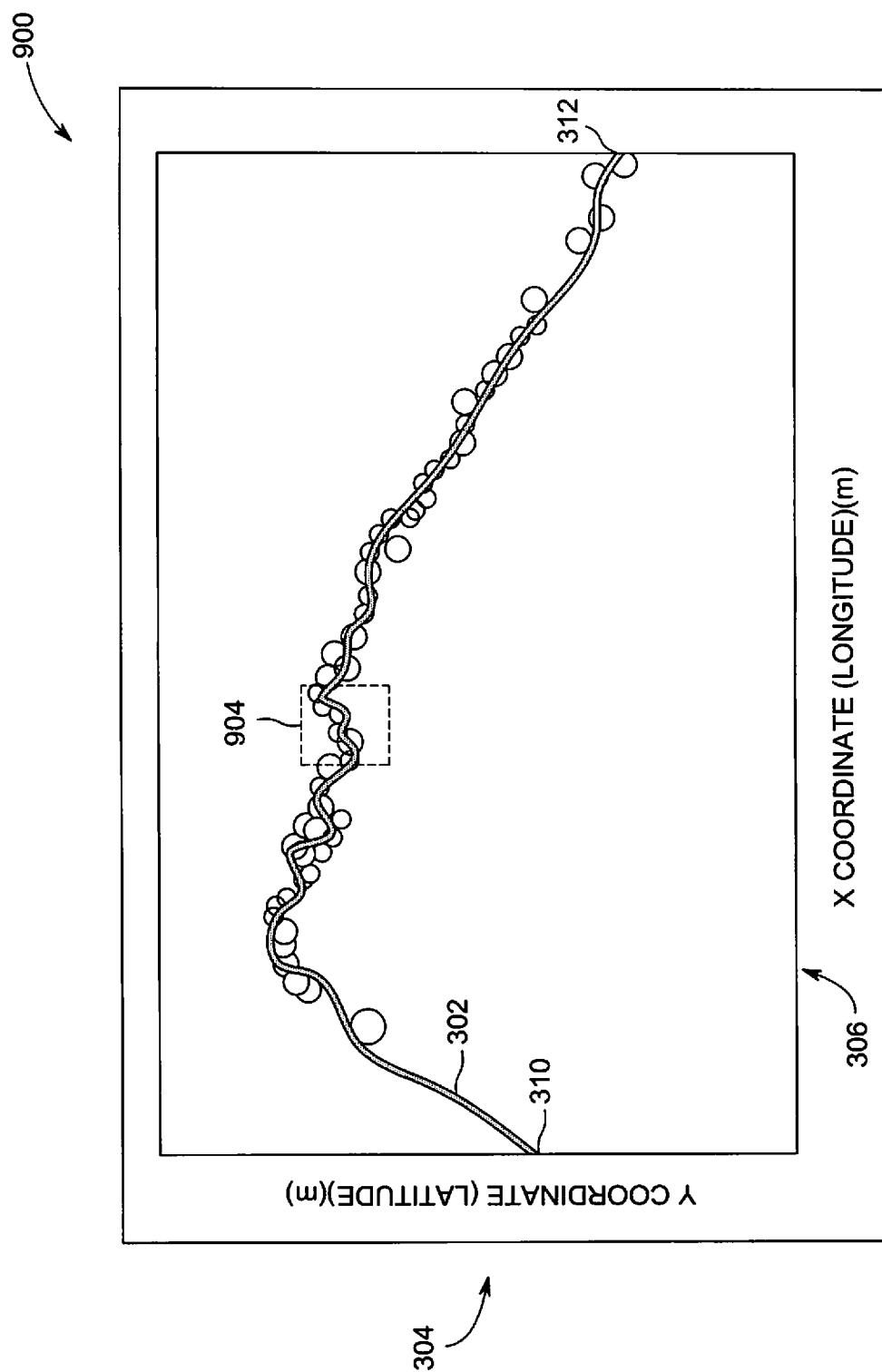
FIG. 9 is a graphical illustration of a route with fitted circles at circular curves, in accordance with an embodiment.

FIG. 9 is a graphical illustration 900 of the route 302 with fitted circles at circular curves, in accordance with an embodiment. The fitted circles may be calculated by the controller circuit 108 utilizing a circle fitting algorithm stored in the memory 106. The controller circuit 108 may execute a circle fitting algorithm such as a least square circle fitting method (e.g., Algebraic fit, Taubin method, Pratt method, and/or the like) to generate circles that align with the curvature values of each time interval (e.g., the time interval 806) of the circular curves. For example, the controller circuit 108 may generate a fitted circle having at least a portion of the circle align with a corresponding circular curve within a predetermined threshold. The controller circuit 108 identifies the radii of the fitted circle as the radius to the corresponding circular curve of the route 302. For example, in connection with FIG. 10, based on a fitted circle 1002 generated by the controller circuit 108 a radius of the circular curve and/or a distance traveled by the vehicle system 100 along the circular curve can be determined by the controller circuit 108.

Figure 10:
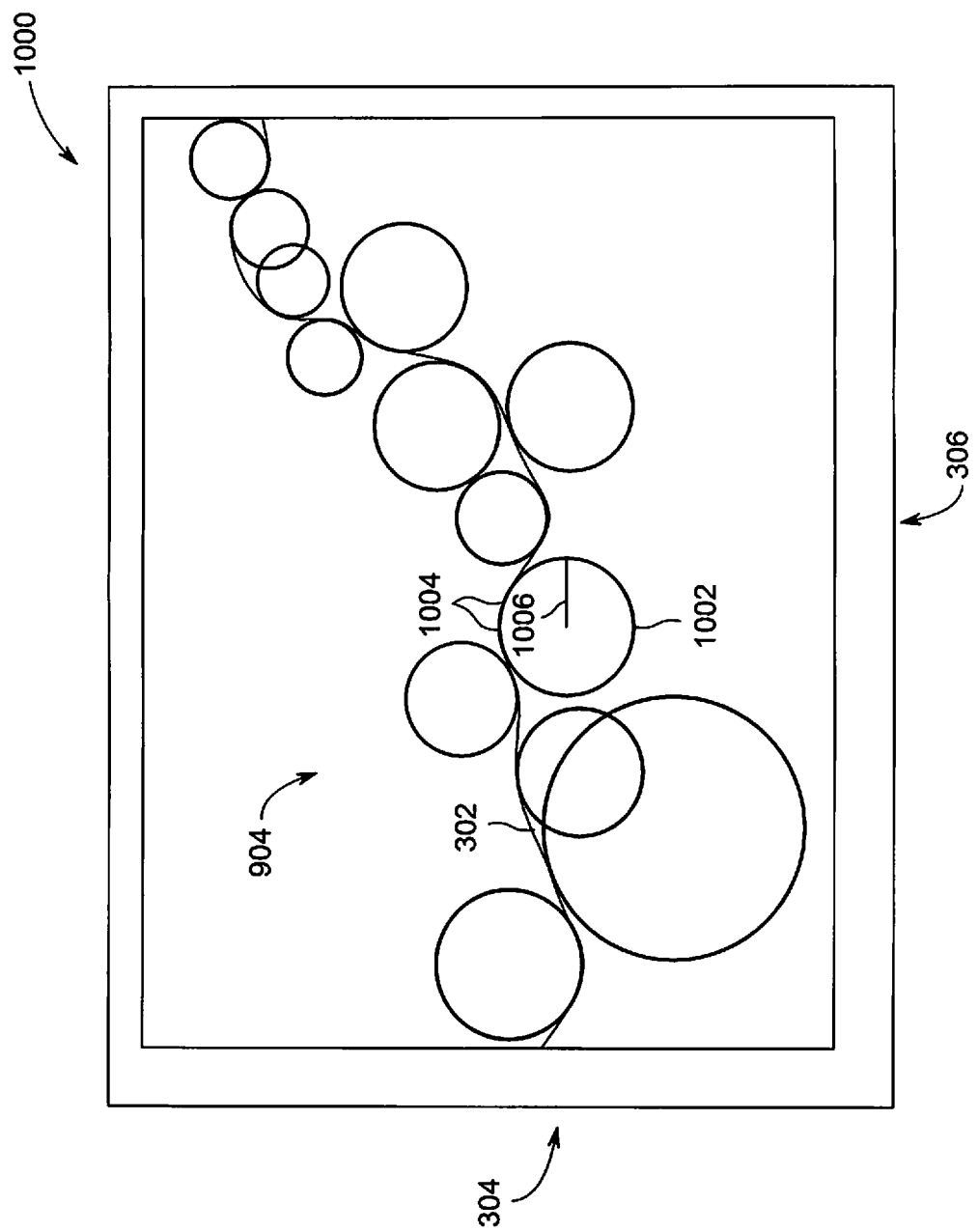
FIG. 10 is a graphical illustration of a select portion of the route shown in FIG. 9, in accordance with an embodiment.

FIG. 10 is a graphical illustration 1000 of a select portion 904 of the route 302, in accordance with an embodiment. The graphical illustration 1000 shows a blow up view of the select portion 904 of the route 302 with fitted circles shown in FIG. 9. The controller circuit 108 calculates the fitted circle 1002, which is aligned with the route. For example, a portion of the fitted circle 1002 is shown aligned with and/or overlaid on a circular curve 1004 of the route 302. The controller circuit 108 identifies a radius 1006 of the fitted circle 1002 as the radius of the circular curve 1004. For example, the fitted circle 1002 has a radius 1006, which is determined by the controller circuit 108 to be the radius of the circular curve 1004.

At 210, the controller circuit 108 may generate a route map. The controller circuit 108 may calculate a length of the route 302, a grade of the route 302, curve information (e.g., radii) of the route 302, altitude information of the route 302, straight throughs, spirals, and/or the like to generate and/or define a route map. The length of the route 302 may be calculated by the controller circuit 108 based on changes in the longitude and latitude positions over time. For example, the controller circuit 108 may calculate a length of the route 302 corresponding to the opposing ends of the portions 730 representing straight throughs. The controller circuit 108 may additionally calculate a circumference of the circular curve based on the radius. The controller circuit 108 may sum the lengths of the straight throughs and the circumferences of the circular curves to determine a length of the route 302.

At 211, the controller circuit 108 may generate duty cycle information based on curvature information of the route 302. The duty cycle information includes information of the circular curves of the route 302 traversed by the vehicle system 100. For example, the duty cycle information may be generated by the controller circuit 108 based on the information for each of the circular curves determined at 206-208. The duty cycle may include a radius length, time interval information, position information, length, grade, speed, and/or the like of the vehicle system 100 traversing along the circular curves along the route 302. The time interval may include when the vehicle system 100 enters the circular curve, when the vehicle system 100 exits the circular curve, and/or a total time of the vehicle system 100 traversing within the circular curve. The position information may correspond to a position relative to the route 302 the vehicle system 100 enters and/or exits the circular curve. For example, the position information may include a distance along the route 302 (e.g., from a start data point 310) when the circular curve starts and/or ends. The grade may be based on the altitude information of the GPS data acquired at 202 based on the timing interval of the circular curve. For example, the controller circuit 108 may compare the altitude information at the start and end of the circular curve to determine a grade of the circular curve.

Figure 11:
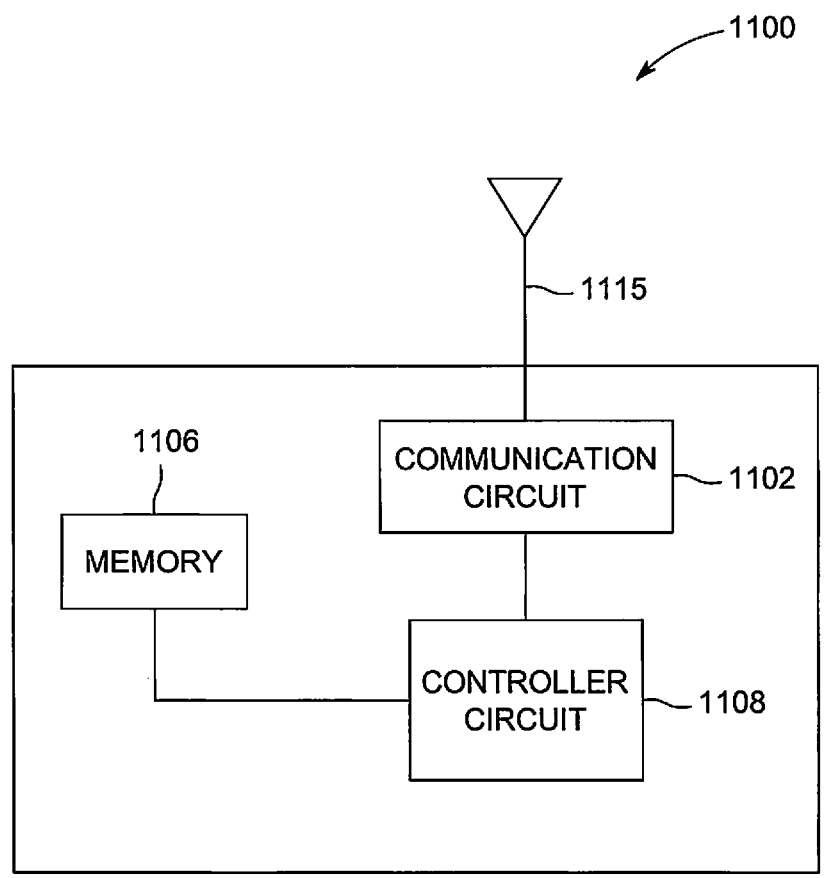
FIG. 11 is a schematic block diagram of a remote system, in accordance with an embodiment.

At 212, a remote system 1100, such as a dispatch facility, may determine a maintenance schedule based on the duty cycle information. FIG. 11 is a schematic block diagram of the remote system 1100, in accordance with an embodiment. The remote system 1100 may include a communication circuit 1102 may include a transceiver, a transmitter and receiver, and/or the like. The communication circuit 1102 may be electrically coupled to an antenna 1115, for example, to receive and/or transmit wireless transmissions. The communication circuit 1102 is configured to communicate wired and/or wirelessly bi-directionally, with off-board locations, such as a plurality of vehicle system 100 along corresponding routes within a transportation network, and/or the like.

The memory 104 is an electronic storage device configured to store a map database, trip data and/or scheduling information of one or more vehicle systems 100, maintenance schedules of the one or more vehicle systems 100, life cycles of candidate components of the one or more vehicle systems 100, duty cycle information of the one or more vehicle systems 100, and/or the like. The contents of the memory 1104 may be accessed by the controller circuit 1108, the communication circuit 1102, and/or the like.

The controller circuit 1108 controls the operation of the remote system 1100. The controller circuit 1108 may be embodied in hardware, such as a processor, controller, or other logic-based device, that performs functions or operations based on one or more sets of instructions (e.g., software). The instructions on which the hardware operates may be stored on a tangible and non-transitory (e.g., not a transient signal) computer readable storage medium, such as the memory 1104. The memory 1104 may include one or more computer hard drives, flash drives, RAM, ROM, EEPROM, or the like. Alternatively, one or more of the sets of instructions that direct operations of the hardware may be hard-wired into the logic of the hardware.

The controller circuit 108 of the vehicle system 100 may instruct the communication circuit 102 to transmit the duty cycle information to the remote system along a bi-directional communication link. The duty cycle information is utilized by the remote system 1100 to determine a life cycle of one or more components of the vehicle system 100 (e.g., wheels, axles, components of the propulsion subsystem 106, and/or the like). For example, the remote system 1100 may determine the sharpness of the circular curves based on the radii of the duty cycle information (e.g., the sharpness of the circular curve is inversely proportional to the radius), amount of time along the route 302 the vehicle system 100 is traversing within the circular curves, grade and/or speed of the vehicle system 100 based on a portion of the route 302, and/or the like to quantify a life cycle of the components of the vehicle system 100.

At 214, the controller circuit 108 may compare the traversed route map with a map database stored in the memory 104. For example, the controller circuit 108 may compare the route map determined at 210, the circular curve information, and/or the like to the map database stored in the memory 104. Based on the comparison, the controller circuit 108 may identify portions of the route map not within the map database (e.g., missing portions of the route not within the map database), positional changes of the route map with respect to the map database, and/or the like representing inaccuracies between the route map and the map database.

At 218, the controller circuit 108 may determine whether a magnitude of the detected inaccuracies are outside an error threshold between the traversed route map and the map database. For example, the controller circuit 108 may calculate an error between the route 302 traversed by the vehicle system 100 and the route corresponding to the map database. The error may represent a magnitude (e.g., percentage, a number of data points, and/or the like) difference between the route map 302 and the route based on the map database.

If the inaccuracies are within the error threshold, then at 220 the remote system 1100 may receive a confirmation of the map database. For example, the controller circuit 108 may transmit to the remote system 1100 a confirmation message. The confirmation message is configured to indicate to the remote system 1100 the map database has been verified and/or confirmed accurate by the vehicle system 100.

If the inaccuracies are outside the error threshold, then at 222 the controller circuit 108 may adjust the map database. For example, the controller circuit 108 may replace and/or supplement portions of the map database stored in the memory 106 that is different than the route 302 with the information of the route 302.

At 224, the updated map database is stored in the memory 104. For example, when the controller circuit 108 adjusts the map database, the controller circuit 108 may store the updated map database that is aligned with the route 302 in the memory 104.

Optionally, at 226 the remote system 1100 may receive the updated map database from the vehicle system 100. For example, the controller circuit 108 may transmit the inaccuracies determined at 218 to the remote system 1100 via a bi-directional communication link between the communication circuits 102 and 1102.

In an embodiment, a system (e.g., for generating a route map) is provided. The system includes a location determining circuit configured to acquire position information of a vehicle system moving along a route. The system includes a controller circuit having one or more processors. The controller circuit is configured to calculate curvatures of the route, based at least in part on the position information, to form a curvature waveform. The controller circuit is further configured to generate a route map based on the curvature waveform.

Optionally, the controller circuit is further configured to generate duty cycle information of the vehicle system relative to the route based on the route map. Additionally or alternatively, the duty cycle information includes at least one of a time interval of a circular curve, a length of the circular curve, grade of the circular curve, or speed of the vehicle system when traversing the circular curve. Additionally or alternatively, the system includes a communication circuit, wherein the controller circuit is further configured to transmit the duty cycle information along a bi-directional communication link to a remote system or a remote vehicle within the vehicle system.

Optionally, the controller circuit is further configured to calculate the curvatures of the route based on a conversion of the position information into two dimensional coordinates.

Optionally, the controller circuit is further configured to identify a circular curve based on the curvature waveform and determine a size of the circular curve by fitting a circle to the circular curve. Additionally or alternatively, the controller circuit is further configured to identify the circular curve by identifying a peak of the curvature waveform. Optionally, the controller circuit is further configured to identify a time interval of the circular curve based on a curvature of the peak within a threshold.

Optionally, the controller circuit is further configured to compare the route map with a map database, and adjust portions of the map database based on the route map.

Optionally, the controller circuit is further configured to identify straight throughs of the route based on the curvature waveform with respect to a filter bandwidth.

Optionally, the controller circuit is further configured to calculate the curvatures of the route by incrementing a measurement window along the route.

Optionally, the controller circuit is further configured to identify a circular curve of the route based on a morphology of the curvature waveform and determine a size of the circular curve.

Optionally, the system includes an energy management system configured to control the vehicle system according to a trip plan. The trip plan may be based at least in part on the route map.

Optionally, the system includes a sensor array configured to generate measurements corresponding to an environment of the vehicle system, wherein the controller circuit is further configured to detect abnormalities of the route based on the measurements. Additionally or alternatively, the sensor array includes an imaging sensor. The measurements may correspond to images of the environment of the vehicle system.

Optionally, the curvature waveform includes a plurality of curvature values. The controller circuit may be configured to calculate each curvature value based on a plurality of data points of the position information. The controller circuit may further be configured to generate the route map based on a morphology of the curvature waveform.

In an embodiment, a method (e.g., for generating a route map) is provided. The method includes acquiring position information of a vehicle system moving along a route. The method further includes calculating curvatures of the route, based on the position information, to form a curvature waveform. The method also includes generating a route map based on the curvature waveform.

Optionally, the method may include generating duty cycle information of the vehicle system relative to the route, based on the route map. Additionally or alternatively, the method includes identifying a circular curve based on the curvature waveform. The duty cycle information may include at least one of a time interval of the circular curve, a length of the circular curve, grade of the circular curve, or speed of the vehicle system when traversing the circular curve.

In an embodiment, a method (e.g., for generating a route map) is provided. The method includes acquiring position information of a vehicle system moving along a route, and calculating curvatures of the route, based on the position information, to form a curvature waveform. The method further includes identifying a circular curve of the route based on a morphology of the curvature waveform, determining a size of the identified circular curve by fitting a circle to the circular curve and defining a route map based on the circular curve. The method also includes generating duty cycle information based on the route map. The duty cycle information includes at least one of a time interval of the circular curve, a length of the circular curve, a grade of the circular curve, or a speed of the vehicle system when traversing along the circular curve.

As used herein, the terms "module", "system," "device," "circuit," or "unit," may include a hardware and/or software system and circuitry that operates to perform one or more functions. For example, a module, unit, device, circuit, or system may include a computer processor, controller, or other logic-based device that performs operations based on instructions stored on a tangible and non-transitory computer readable storage medium, such as a computer memory. Alternatively, a module, unit, device, circuit, or system may include a hard-wired device that performs operations based on hard-wired logic and circuitry of the device. The modules, units, circuits, or systems shown in the attached figures may represent the hardware and circuitry that operates based on software or hardwired instructions, the software that directs hardware to perform the operations, or a combination thereof. The modules, systems, devices, circuits, or units can include or represent hardware circuits or circuitry that include and/or are connected with one or more processors, such as one or computer microprocessors.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or operations, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A system comprising:
    a location determining circuit configured to determine position information of a vehicle system moving along a track;
    a controller circuit having one or more processors, wherein the controller circuit is configured to:
        calculate curvatures of the track, based at least in part on the position information, to form a curvature waveform, the curvature waveform representative of magnitudes of the curvatures of the track at different locations along the track;
        identify one or more of the curvatures of the track as one or more circular curves in the track based on changes in the magnitudes of the curvatures that are within a designated threshold of a peak curvature magnitude in the curvature waveform;
        generate a route map based on a size of the one or more circular curves.

2. The system of claim 1, wherein the controller circuit is further configured to generate duty cycle information of the track based on the route map.

3. The system of claim 2, wherein the duty cycle information includes at least one of a time interval during which the vehicle system traveled on the one or more circular curves, a length of the one or more circular curves, a grade of the one or more circular curves, or a speed at which the vehicle system moved while traversing the one or more circular curves.

4. The system of claim 2, further comprising a communication circuit, wherein the controller circuit is further configured to transmit the duty cycle information along a bi-directional communication link to a remote system or a remote vehicle within the vehicle system.

5. The system of claim 1, wherein the controller circuit is further configured to calculate the curvatures of the track based on a conversion of the position information into two dimensional coordinates.

6. The system of claim 1, wherein the controller circuit is further configured to calculate the size of the one or more circular curves by fitting one or more circles to the one or more circular curves.

7. The system of claim 6, wherein the controller circuit is further configured to identify the one or more circular curves by determining that the magnitudes of the curvatures that are within the designated threshold of the peak curvature magnitude in the curvature waveform remain at or above the designated threshold.

8. The system of claim 7, wherein the controller circuit is further configured to identify one or more time intervals of the one or more circular curves based on the changes in the magnitudes of the curvatures.

9. The system of claim 1, wherein the controller circuit is further configured to compare the route map with a map database, and adjust portions of the map database based on the route map.

10. The system of claim 1, wherein the controller circuit is further configured to identify straight throughs of the track based on the curvature waveform with respect to a filter bandwidth.

11. The system of claim 1, wherein the controller circuit is further configured to calculate the curvatures of the track by incrementing a measurement window along the curvature waveform and calculating the curvatures of the one or more circular curves based on the curvatures within the measurement window.

12. The system of claim 1, wherein the controller circuit is further configured to identify the one or more circular curves of the track based on a morphology of the curvature waveform.

13. The system of claim 1, further comprising an energy management system configured to control the vehicle system according to a trip plan, wherein the trip plan is based at least in part on the route map.

14. The system of claim 1, further comprising a sensor array configured to generate measurements corresponding to an environment of the vehicle system, wherein the controller circuit is further configured to detect abnormalities of the track based on the measurements.

15. The system of claim 14, wherein the sensor array includes an imaging sensor, the measurements corresponding to images of the environment of the vehicle system.

16. The system of claim 1, wherein the controller circuit is configured to calculate each of the magnitudes of curvature based on a plurality of data points of the position information, and the controller circuit is further configured to generate the route map based on a morphology of the curvature waveform.

17. A method comprising:
    acquiring position information of a vehicle system moving along a track;
    calculating curvatures of the track, based on the position information, to form a curvature waveform, the curvature waveform representative of magnitudes of the curvatures of the track at different locations along the track;
    identifying one or more of the curvatures of the track as a circular curve in the track based on changes in the magnitudes of the curvatures that are within a designated threshold of a peak curvature magnitude in the curvature waveform;
    calculating a size of the one or more circular curves based on the magnitudes of the curvatures that are within the designated threshold of the peak curvature magnitude in the curvature waveform; and
    generating a route map based on the size of the one or more circular curves.

18. The method of claim 17, further comprising generating duty cycle information of the track based on the route map.

19. The method of claim 18, wherein the duty cycle information includes at least one of a time interval during which the vehicle system traveled on the one or more circular curves, a length of the one or more circular curves, a grade of the one or more circular curves, or a speed at which the vehicle system moved while traversing the one or more circular curves.

20. A method comprising:
- acquiring position information of a vehicle system moving along a track;
- calculating curvatures of the route, based on the position information, to form a curvature waveform, the curvature waveform representative of magnitudes of the curvatures of the track at different locations along the track; and
- defining a route map based on the size of the curvature waveform.

\* \* \* \* \*